(12) United States Patent
Rudesill et al.

(10) Patent No.: US 7,975,642 B2
(45) Date of Patent: Jul. 12, 2011

(54) AUTOMATIC SEASONING DEVICE

(75) Inventors: Brian R. Rudesill, Hudson, WI (US); Mark Edward Allegra, Brentwood, TN (US)

(73) Assignee: Franke Technology and Trademark Ltd (CH)

( * ) Notice: Subject to any disclaimer, the term of this patent is extended or adjusted under 35 U.S.C. 154(b) by 1119 days.

(21) Appl. No.: 11/736,961

(22) Filed: Apr. 18, 2007

(65) Prior Publication Data

US 2008/0023101 A1 Jan. 31, 2008

Related U.S. Application Data

(60) Provisional application No. 60/745,030, filed on Apr. 18, 2006.

(51) Int. Cl.
*A23G 3/00* (2006.01)
*B05C 19/06* (2006.01)

(52) U.S. Cl. ............... 118/13; 118/24; 118/308; 99/494; 141/131; 141/248; 141/83

(58) Field of Classification Search .................... 118/13, 118/24, 31, 308; 99/494; 239/650, 651, 239/658, 671, 689, 102.1; 222/414, 485, 222/486; 141/131, 248, 83; 426/289, 438
See application file for complete search history.

(56) References Cited

U.S. PATENT DOCUMENTS

| 3,903,941 | A | * | 9/1975 | Eisenberg | 141/78 |
| 4,715,315 | A | * | 12/1987 | Burford | 118/684 |
| 5,189,944 | A | | 3/1993 | Rasmussen et al. | |
| 5,768,984 | A | * | 6/1998 | Gallego | 99/494 |
| 5,855,671 | A | | 1/1999 | Scherping et al. | |
| 6,619,226 | B2 | | 9/2003 | Rooke | |
| 6,733,809 | B2 | * | 5/2004 | Zimmerman et al. | 426/293 |
| 6,869,633 | B2 | * | 3/2005 | Sus et al. | 426/438 |
| 6,962,128 | B2 | | 11/2005 | Dove et al. | |

* cited by examiner

*Primary Examiner* — Laura Edwards
(74) *Attorney, Agent, or Firm* — Pepper Hamilton LLP (57) ABSTRACT

An automatic seasoning device that includes a hopper, a seasoning dispenser positioned to receive seasoning from the hopper; and a moveable transition tray positioned to receive seasoning from the seasoning dispensing drum.

5 Claims, 10 Drawing Sheets

AUTOMATIC SEASONING DEVICE

CROSS-REFERENCE TO RELATED APPLICATIONS

This patent application claims priority to co-pending U.S. provisional patent application No. 60/745,030, filed on Apr. 18, 2006, entitled "Automatic Seasoning Device", the disclosure of which is incorporated herein by reference in its entirety.

STATEMENT REGARDING FEDERALLY SPONSORED RESEARCH

Not applicable.

NAMES OF PARTIES TO A JOINT RESEARCH AGREEMENT

Not applicable.

SEQUENCE LISTING

Not applicable.

BACKGROUND

1. Technical Field

The disclosed embodiments generally relate to the field of automated food processing equipment for the restaurant industry. Specifically, the disclosed embodiments relate to an automated seasoning device to be used during the preparation of batch prepared foodstuffs.

2. Description of the Related Art

The restaurant industry, and particularly the fast food restaurant industry, depends upon quickly preparing, packaging (or plating), and serving of food in order to, for example, minimize customer waiting and to ensure a freshly prepared quality to the served food. In a fast food restaurant preparation of French fries, typically deep fried potatoes are tossed from a frying basket into a holding area. The fries may then be salted by hand or with a handheld salting device that ensures a controlled portion of salt is delivered to the French fries in the holding area. The salted fries are manually tumbled or agitated to distribute the salt amongst the French fries.

At times, there is a delay between when the cooked French fries are delivered to the holding area and when they are salted. While the fries are silting, they begin to cool, and when they are eventually salted, the adhesion of salt is poor. Other times, the holding area may not be emptied before another batch of cooked French fries is transferred into the holding area. When these freshly cooked fries are salted, the fries from the previous batch end up being double-salted.

A need exists for an apparatus and method for automating the preparation of seasoned foods, such as salted French fries, wherein such apparatus and method would further enhance the consistency of salting, and improve the overall distribution and adhesion of salt or other seasoning on the cooked French fries. While these needs exist for the preparation of salted French fries, it is also recognized that the seasoning needs exist for any foods, breaded or non-breaded, which are prepared in-batch or individually and are subsequently seasoned, for example but not limited to: other fried or cooked vegetables, chicken pieces or nuggets, shrimp, and so forth.

The disclosure contained herein describes attempts to address one or more of the problems described above.

SUMMARY

An embodiment of an automatic seasoning device may include a hopper, a seasoning dispenser positioned to receive a seasoning from the hopper, and a moveable transition tray positioned to receive the seasoning from the seasoning dispenser.

In other embodiments, a seasoning dispenser may include a seasoning dispensing drum ad the drum may include one or more grooves. Embodiments may include a drum motor to rotate the seasoning dispensing drum.

In still other embodiments a seasoning dispenser may include a seasoning dispensing sliding plate system. A seasoning dispensing sliding plate system may include a loading plate positioned to receive the seasoning from the hopper. The loading plate may contain a plurality of loading plate openings. A seasoning dispensing sliding plate system may further contain at least one slide plate positioned to receive the seasoning from the loading plate. The at least one slide plate may include a plurality of slide plate pockets. A seasoning dispensing sliding plate system may also include at least one dispenser plate positioned to receive the seasoning from the slide plate and deliver the seasoning to a food receiving area. The at least one dispenser plate may contain a plurality of dispenser plate openings. In embodiments, the plurality, of loading plate openings may be a plurality of conical cavities. Some embodiments may include a motor positioned to slide the slide plate.

In still more embodiments, a plurality of seasoning diverter rods may be positioned between the seasoning dispenser and the transition tray.

In yet other embodiments, the transition tray may further include a tray rotation system, A tray rotation system may contain a transition tray motor, at least one cam arm connected to and driven by the transition tray motor, and at least one hinge block. Some embodiments include a waste collection tray positioned to collect waste from the moveable transition tray. Still other embodiments may include a packaging area positioned to collect foodstuffs from the moveable transition tray. Still yet other embodiments may include an automatic actuating sensing device.

A method for seasoning a foodstuff may include loading a seasoning into a hopper of automatic seasoning device; moving a portion of the seasoning from the hopper onto a seasoning dispenser, depositing a foodstuff onto a food receiving surface of a moveable transition tray of the automatic seasoning device; actuating the automatic seasoning device resulting in actuation of the seasoning dispenser, where the seasoning is deposited from the seasoning dispenser onto the foodstuff to produce a seasoned foodstuff; and automatically moving the transition tray to remove the seasoned foodstuff from moveable transition tray to a packaging area.

A method embodiment may include reloading the hopper with seasoning as the hopper becomes depleted of the seasoning. In some embodiments the actuation of the automatic seasoning device may be triggered by receipt of a predetermined amount of the foodstuff on the transition tray.

Other embodiments of an automatic seasoning device may include a hopper; a seasoning dispenser positioned to receive a seasoning from the hopper; a moveable transition tray positioned to receive the seasoning from the seasoning dispensing drum; and a transition tray rotation system. A transition tray rotation system may include a transition tray motors at least one cam arm connected to and driven by the transition tray motor, and at least one hinge block. In embodiments an automatic seasoning device may include an automatic actuating sensing device.

In some embodiments the seasoning dispenser may include a drum including one or more grooves. In other embodiments the seasoning dispenser may include a seasoning dispensing slide plate system.

In many embodiments, the device may include seasoning diverter rods positioned between the seasoning dispenser and the transition tray, and a waste collection tray positioned to collect waste form the moveable transition tray. Yet is still other embodiments the device may include a packaging area positioned to collect foodstuffs from the moveable transition tray.

BRIEF DESCRIPTION OF THE DRAWINGS

FIG. 6A depicts a cross-section of a seasoning dispensing sliding plate system in a portion loading position.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Figure 1:
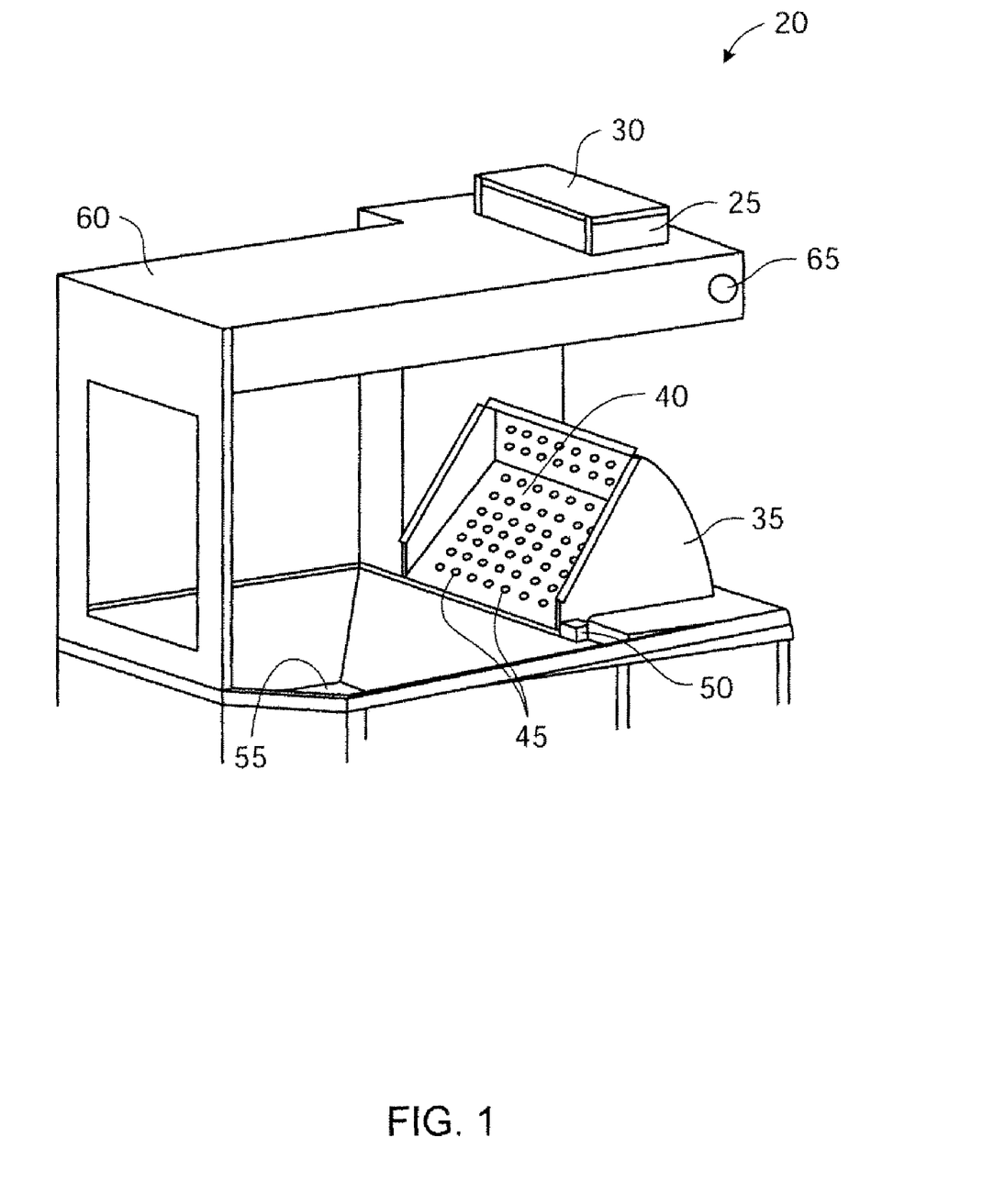
FIG. 1 depicts an exemplary embodiment of an automatic seasoning device.

An exemplary embodiment of an automatic seasoning device 20 is depicted in FIG. 1. The seasoning device 20 includes a seasoning hopper 25 to contain the seasoning. The hopper 25 may include any structure that holds seasoning prior to its application to foodstuff. The hopper may optionally further include a hopper cover 30. The hopper can be made from a plastic material, such as, but not limited to, molded polyethylene. Alternatively, the hopper can be constructed from any suitable material for holding seasoning.

Figure 2:
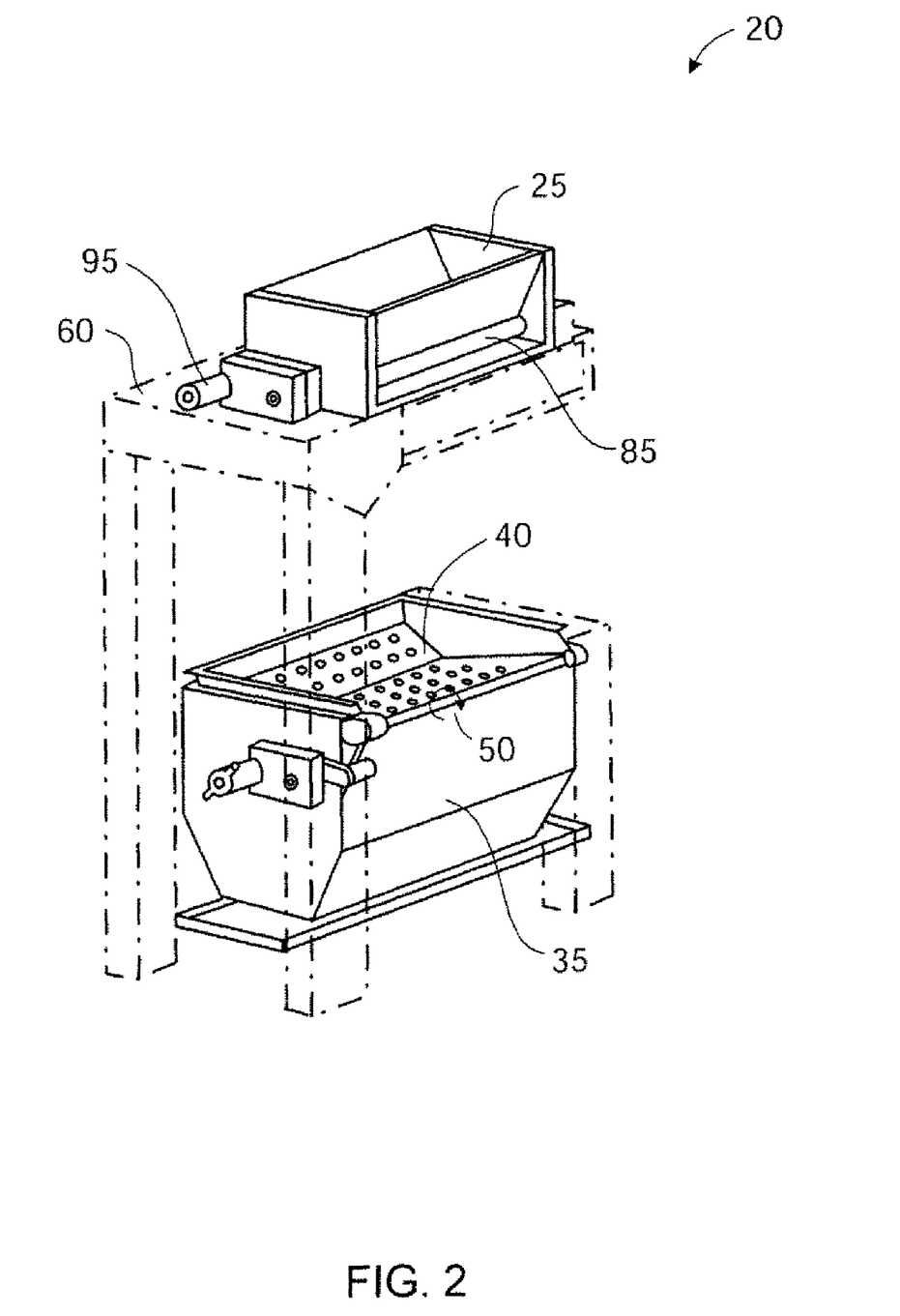
FIG. 2 depicts an exemplary embodiment of an automatic seasoning device, with the enclosure removed to show details of a seasoning hopper and moveable transition tray.

Also depicted in FIG. 1 is a moveable transition tray 35 in an upright, inclined, food delivery or near vertical position. The transition tray 35 further includes a food receiving surface 40. Optionally, the food receiving surface 40 may include a plurality of perforations 45 that permit wastes to fall off or drain off of the food receiving surface 40. The food receiving surface 40 may include essentially one flat horizontal surface, or it may include different sections offset at different angles from each other, as shown in FIG. 1 and FIG. 2. The latter condition may be desired to increase the drainage of waste from the receiving surface 40. Optionally, the transition tray 35 may rotate about an axis 50. When the moveable transition tray 35 is in the inclined position depicted in FIG. 1, it is in the position that delivers the seasoned foodstuff into the packaging area 55. The transition tray 35 may be constructed from stainless steel, but it can be made of any material that is capable of handling temperatures associated with cooked or deep-fried foods.

In the embodiment of FIG. 1 the seasoning device 20 includes an enclosure or housing 60. The housing 60 may include sheet metal or may be constructed from any material capable of supporting the various components of the automatic seasoning device 20. The housing 60 may also house items such as but not limited to heat lamps (not shown) to keep the food in the packaging area 55 warm.

The embodiment of FIG. 1 includes an actuation mechanism 65, such as a button or switch, to start the seasoning process. Remote activation devices, such as computer-controlled devices also may be used. Alternatively, an automatic actuating sensing device, for example, but not limited to, weight sensors, optical detectors, or other sensing devices (not shown) could be associated with the transition tray 35 that would automatically start the seasoning process when food of a predetermined weight is placed on the food receiving surface 40. Suitable sensing devices are known to those skilled in the art.

Figure 3:
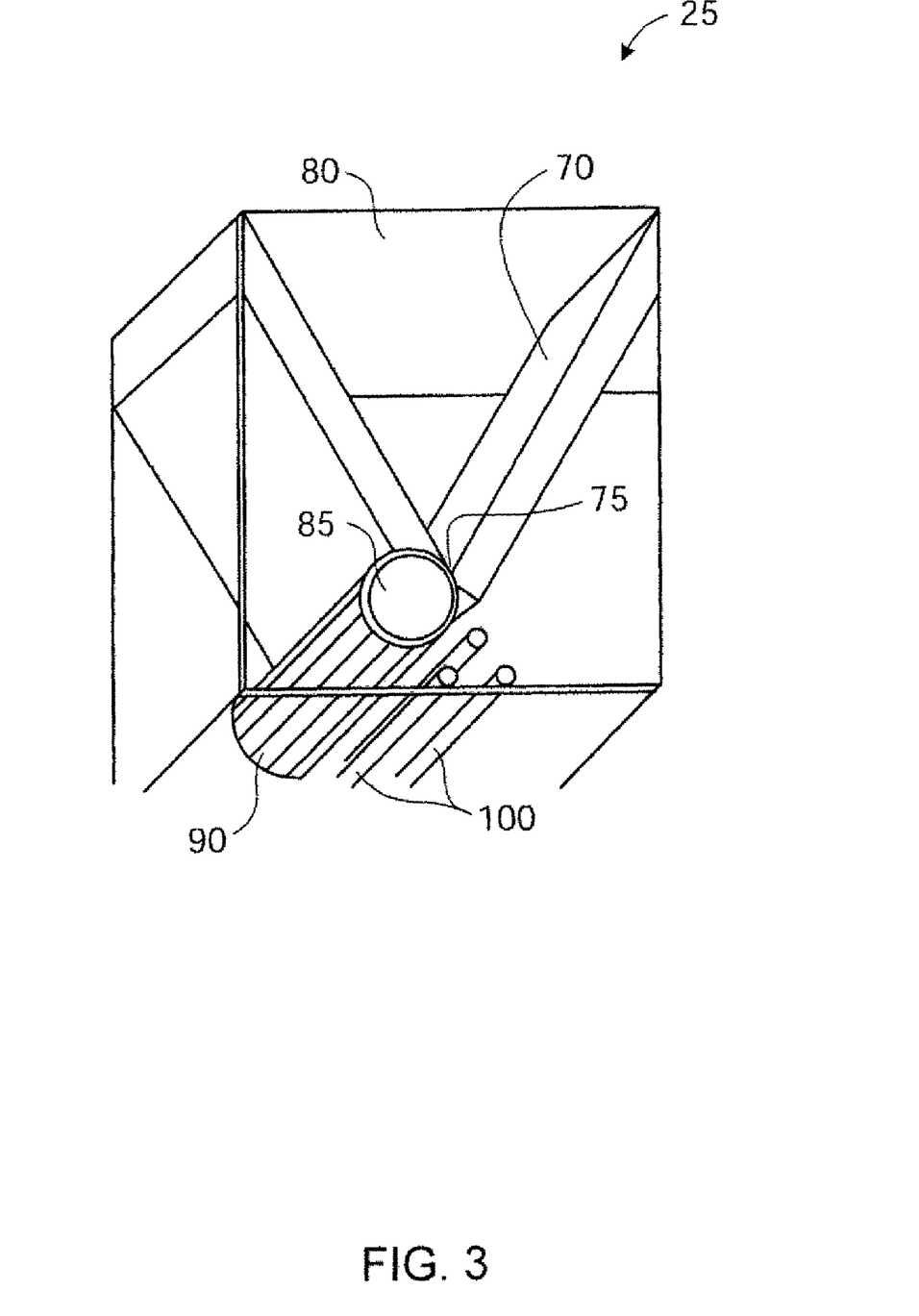
FIG. 3 is a drawing of an embodiment of a seasoning hopper with a grooved seasoning drum and seasoning diverter rods.

Now referring to FIG. 2, FIG. 3, and FIGS. 4A and 4B, details of a seasoning hopper 25 and the moveable transition tray 35 of an embodiment of an automatic seasoning device 20 become more apparent. Referring to FIG. 3 an embodiment of a hopper 25 may include one or more angular walls 70 that are sloped toward a hopper opening 75 to direct seasoning into the opening 75. An embodiment of a hopper 25, as depicted in FIG. 3 may include at least one side wall 80 that is constructed from a transparent or semi-transparent solid material, such as for example, but not limited to: molded polyethylene; polystyrene; or polymethyl methacrylate (PMMA)—more commonly called acrylic glass or simply acrylic. A degree of transparency for a side wall 80 or other hopper wall is a desirable, but not necessary embodiment in that it makes it visible to a user when seasoning is depleted from the hopper 25, and it is time to recharge the hopper 25 with more seasoning.

Referring again to FIG. 3, an embodiment of a seasoning dispenser may include a seasoning dispensing drum 85 that is positioned to receive seasoning from the hopper opening 75. In one embodiment, the seasoning dispensing drum 85 is rotatable. The seasoning dispensing drum 85 may be fabricated out of for example, but not limited to, injection molded acrylonitrile butadiene styrene (ABS). The seasoning dispensing drum 85 may include one or more grooves 90. The grooves 90 may be periodically displaced from each other. The grooves 90 may be designed to accommodate a predetermined or pre-portioned amount of seasoning. Referring to FIG. 2, the drum may be rotated by a drum motor 95, which may be an electric motor, a battery operated motor, or any other type of device that is familiar to one skilled in the at and is capable of rotating the drum. The drum motor 95 may be of the stepping-type of motor, which turns the drum 85 rough a pre-specified rotation for each actuation of the drum motor 95. For example the drum motor 95 may be set to rotate the drum 85 to the extent that one groove 90 of the drum 85 is advanced and delivers the predetermined amount of seasoning for each actuation. Alternatively, the drum motor 95 could rotate the drum 85 so that several drum grooves 90 are advanced to increase the portion of seasoning delivered to the foodstuff on the food receiving surface 40.

Referring again to FIG. 3, adjacent to the underside of the seasoning dispensing drum 85, an embodiment may include one or more seasoning diverter rods 100. The diverter rods 100 may be positioned staggered above and below each other. In one embodiment, a diverter rod 100 is positioned so that the seasoning comes off of a rotatable seasoning dispensing dr 85, and hits the diverter rod 100. The seasoning is then split into two streams. Two more diverter rods 100 may be positioned below and offset enough from the diverter rod 100 that is closest to the drum 85, so that the streams of seasoning each hit one of the offset diverter rods 100. This results in four streams of seasoning. It is recognized that the arrangement of the diverter rods 100 provides a more even distribution of seasoning. It is further recognized that other arrangements of diverter rods 100 are possible. The embodiment described supra is exemplary and this disclosure recognizes and claims any arrangement of diverter rods that may be useful.

Figure 4A:
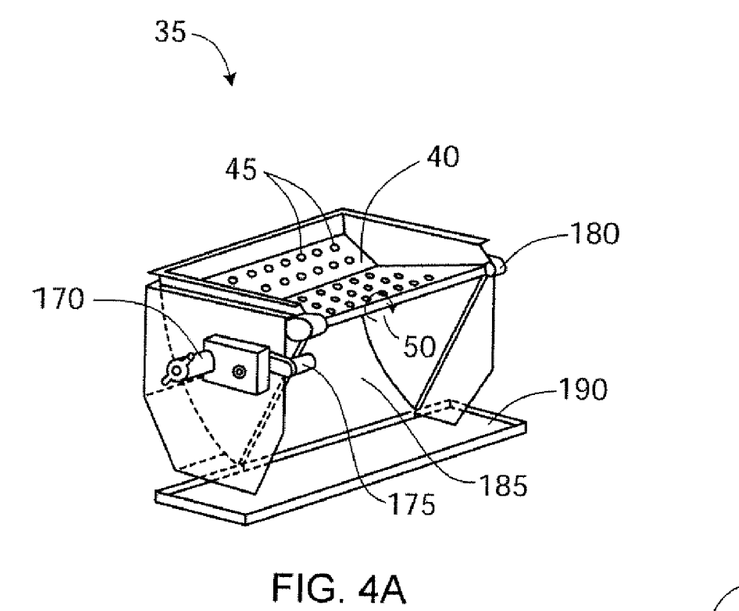
FIG. 4A shows a moveable transition tray in the down position.
Figure 4B:
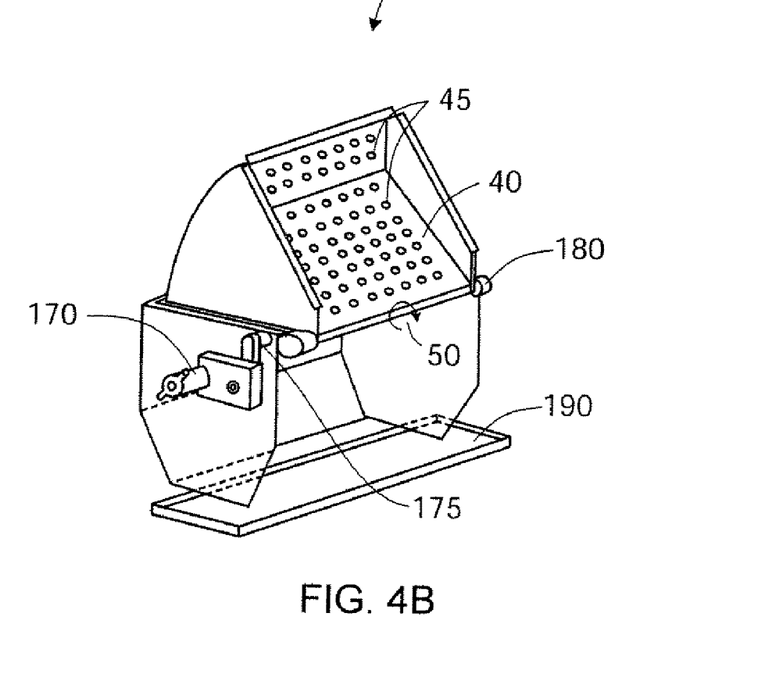
FIG. 4B shows a moveable transition tray in the up position.
Figure 5:
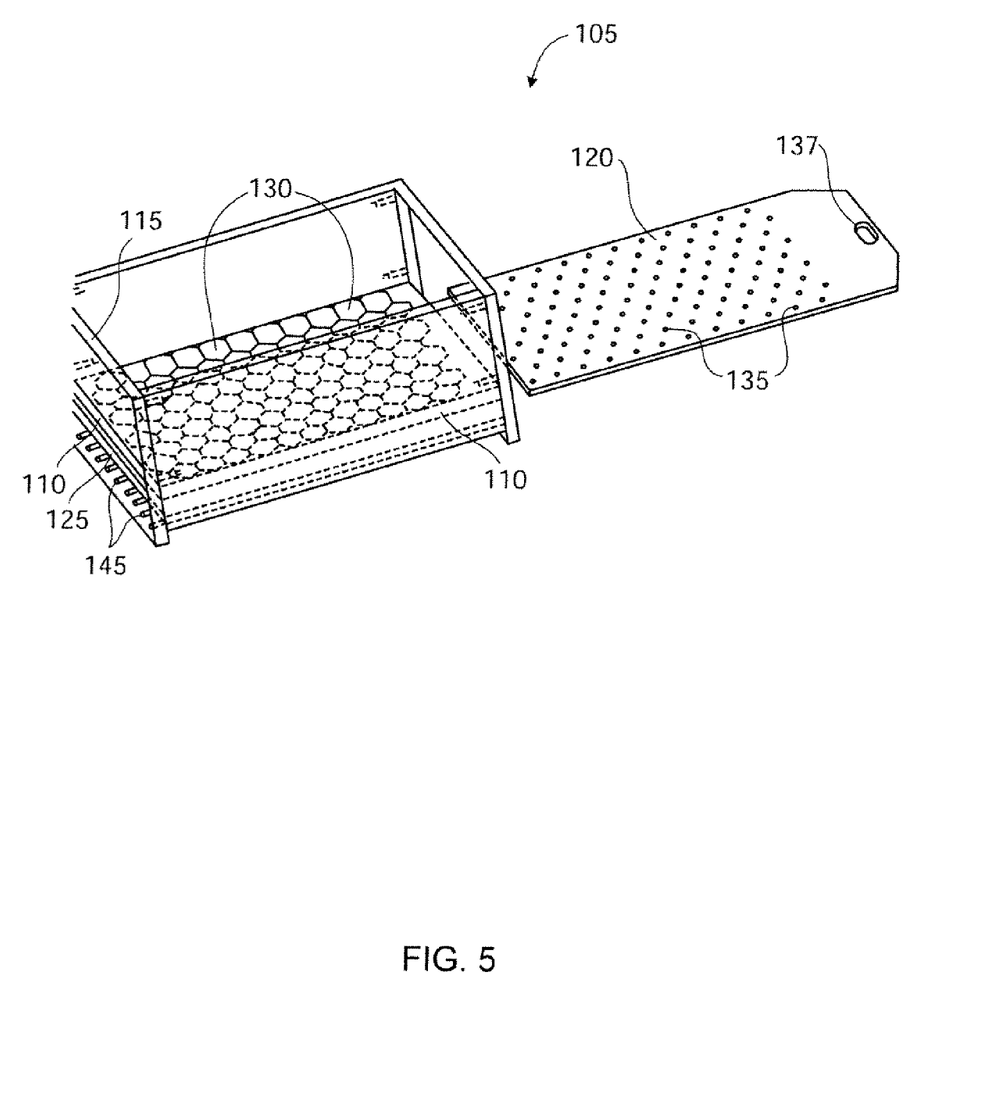
FIG. 5 depicts a top perspective view of a seasoning dispensing sliding plate system.
Figure 6:
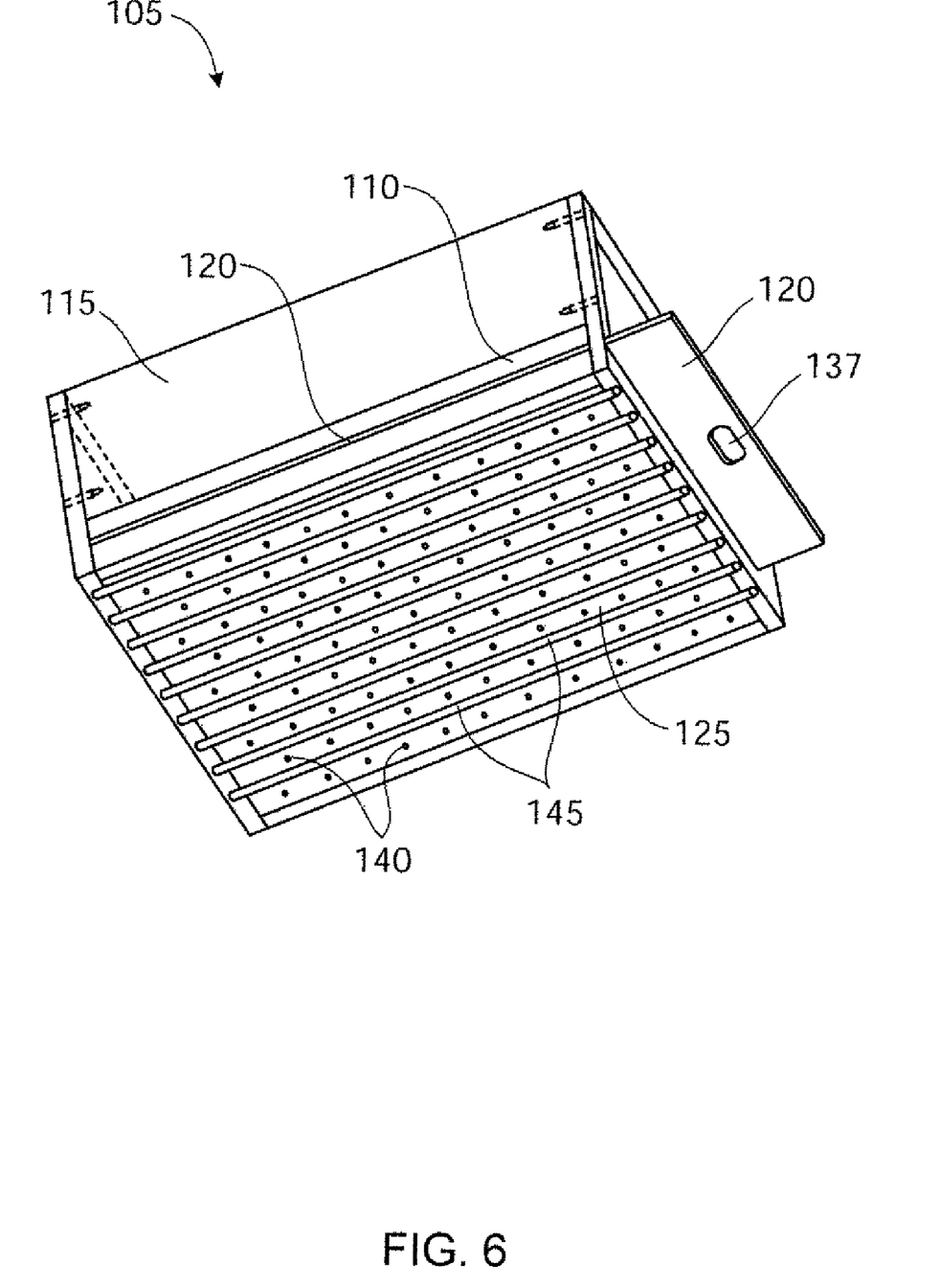
FIG. 6 depicts a bottom perspective view of a seasoning dispensing sliding plate system.
Figure 7:
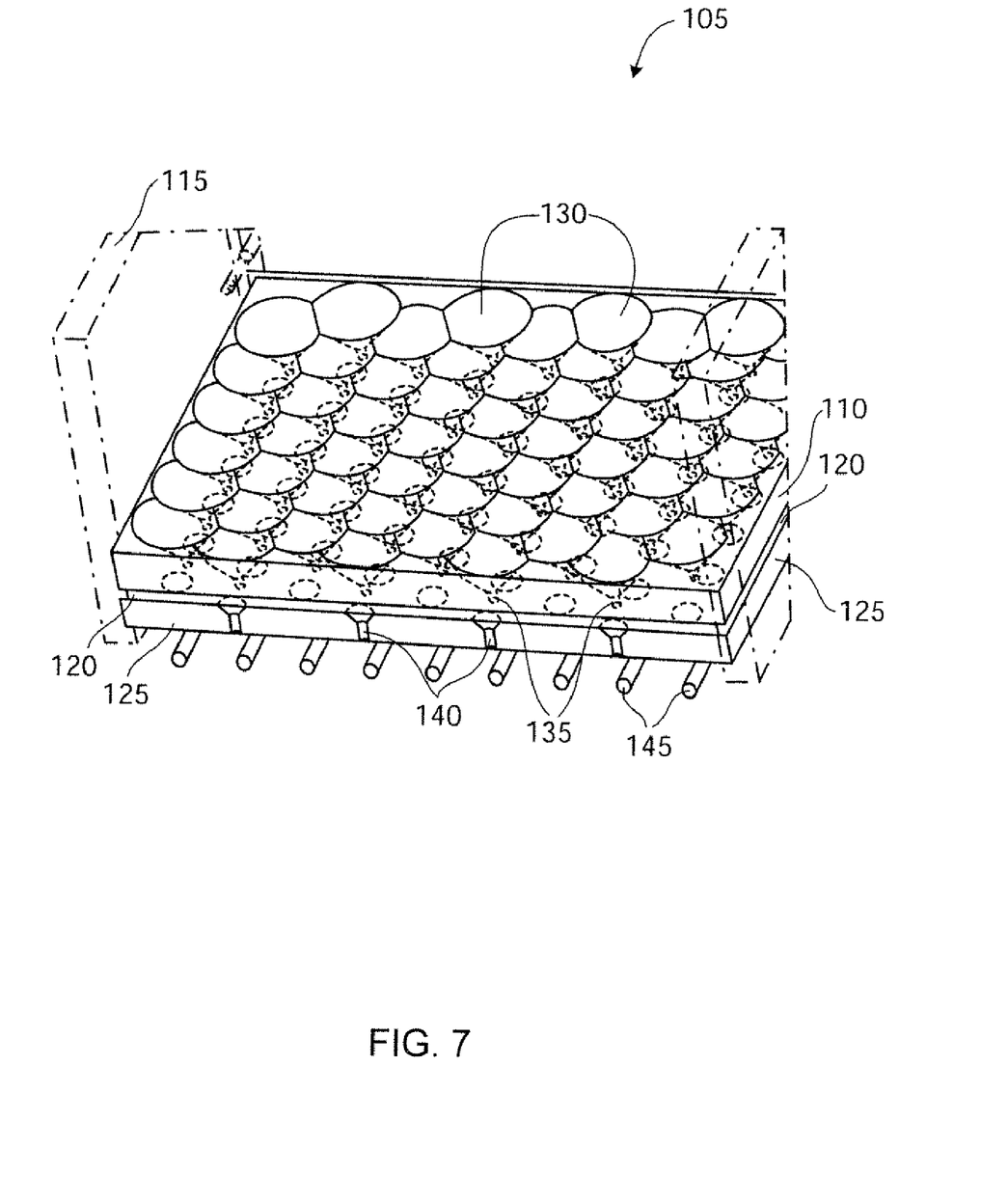
FIG. 7 is a top ad partially transparent perspective view of a seasoning dispensing sliding plate system.

Referring to FIGS. 5-7, another exemplary embodiment of a seasoning dispenser may include a seasoning dispensing sliding plate system 105. FIG. 5 is a top perspective view of a seasoning dispensing sliding plate system 105. FIG. 6 is a bottom perspective view of a seasoning dispensing sliding plate system 105. FIG. 7 is a top and partially transparent perspective view of a seasoning dispensing sliding plate system 105. A seasoning dispensing sliding plate system 105 may include a loading plate 110 (shown in transparent view in FIG. 7) positioned to receive the seasoning from a hopper 115. A seasoning dispensing sliding plate system 105 may also include at least one slide plate 120 positioned to receive the seasoning from the loading plate 110. A seasoning dispensing sliding plate system 105 may further include at least one dispenser plate 125 positioned to receive the seasoning from the at least one slide plate 120 and deliver the seasoning to a food receiving surface (40 in FIGS. 1, 2, 4A and 4B).

A loading plate 110 may include a plurality of loading plate openings, which in an embodiment may include a plurality of cavities 130, optionally of conical shape which are open at both ends, and are positioned to hold seasoning from the hopper 115. It is recognized that the plurality of cavities 130 need not be conical, but rather any shape of a cavity that is open at both ends, for example, but not limited to, a cylindrical hole is within the scope of embodiments herein. The conical shape of the plurality of cavities 130, when used, aids in directing the seasoning to the at least one slide plate 120.

The at least one slide plate 120 may include a plurality of slide plate pockets 135. In an embodiment, the plurality of slide plate pockets 135 may be cylindrical holes that go through the at least one slide plate 125. Other shapes of slide plate pockets 135 such as, but not limited to, conical-shaped holes, slits, and the like are also included in embodiments herein. The slide plate pockets 135 may be designed to hold specific portions of seasoning so that the food receives a desired amount of seasoning when the seasoning is dispensed through the at least one dispenser plate 125. In addition, the at least one slide plate 120 may include a grasping mechanism 137, such as but not limited to a hole that facilitates sliding of the at least one slide plate 120 between the loading plate 110 and the at least one dispenser plate 125.

The at least one dispenser plate 125 may further include a plurality of dispenser plate openings 140. The dispenser plate openings 140 may be cylindrical, conical, or any other shape or mixtures of shapes that facilitate dispensing of the seasoning. During operation of a seasoning dispensing sliding plate system 105, the plurality of dispenser plate openings 140 enable seasoning to be transferred from the plurality of slide plate pockets to the food, which may be located on a food receiving surface (40 in FIGS. 1, 2, 4A and 4B).

In some embodiments, a plurality of seasoning diverter rods 145 may also be included in a seasoning dispensing sliding plate system 105. The plurality of seasoning diverter rods 145 may be positioned so that when seasoning is dispensed through the plurality of dispenser plate openings 140, a stream of seasoning contacts the plurality of seasoning diverter rods 145, and is broken into two streams of seasoning. This ensures more even coverage of seasoning on the food product. It is recognized that the plurality of seasoning diverter rods 145 may include any arrangement of diverter rods 145 that facilitates more even coverage of the seasoning on the food product. This includes for example, but is not limited to, multiple rows of seasoning diverter rods 145, staggered multiple rows, and the like.

It is recognized that the geometrical arrangements of the plurality of cavities 130, the plurality of slide plate pockets 135, the plurality of dispenser plate openings 140, and the plurality of seasoning diverter rods 145 may be arranged in any fashion to achieve a desired pattern of seasoning of food on a food receiving surface (40 in FIGS. 1, 2, 4 and 4B). For example, it may be desirable to provide more seasoning to food in the center of a food receiving surface, and the geometrical arrangement of the aforementioned features could be altered for that purpose. The exact geometrical arrangements of the aforementioned features to achieve a desired pattern of seasoning would be known to one of ordinary skill in art without undue experimentation, and as such, need not be detailed herein.

In addition to the geometrical arrangement of the features described in the preceding paragraph, the number of slide plates and the number of dispenser plates may be varied. These could be varied to allow for different amounts of seasoning to be dispensed by sliding either one or more slide plates in combination with either one or more dispenser plates. This feature would be known to one of ordinary skill in art without undue experimentation, and will become even more apparent when the operation of a seasoning dispensing sliding plate system 105 is described in more detail hereinbelow.

Materials of composition of the various plates 110, 120, 125 in the seasoning dispensing sliding plate system 105 may include any materials and/or coatings that are chemically resistant to the seasoning, non-toxic, and have the mechanical properties to withstand multiple operations of sliding of the at least one slide plate 120 against the other plates 110, 125. In embodiments, it may be desirable to use materials that exhibit low frictional forces for sliding. Suitable materials include but are not limited to plastics, stainless steels, self-lubricating materials, Teflon®-coated materials, Delrin®, and the like. It may also be desirable for the plurality of seasoning diverter rods 145 to exhibit non-stick qualities, so that the seasoning does not stick to the rods 145, and degrade the effectiveness of the rods 145 towards providing an even coverage of seasoning on the food product. As such, materials and/or coatings for the rods 145 include, but are not limited to, those mentioned for the various plates 110, 120, and 125.

A seasoning dispensing sliding plate system 105 may also include a motor or motors (not shown) positioned to slide the at least one slide plate in between the loading plate and the at least one dispenser plate. A motor may include, for example, those described herein for other embodiments of seasoning dispensers. A motors together with other hardware that is familiar to those of ordinary skill in the art could be engaged with a grasping mechanism 137 of a slide plate 120, so that the operation of seasoning could be fully automated. Automating the system may include utilizing other features that are described herein for other embodiments of seasoning dispensers. Alternatively, a seasoning dispensing sliding plate system 105 may be designed to be operated manually without a motors and in embodiments may include a spring or other device that allows the slide plate to return to its original position after being manually actuated.

Figure 8A:
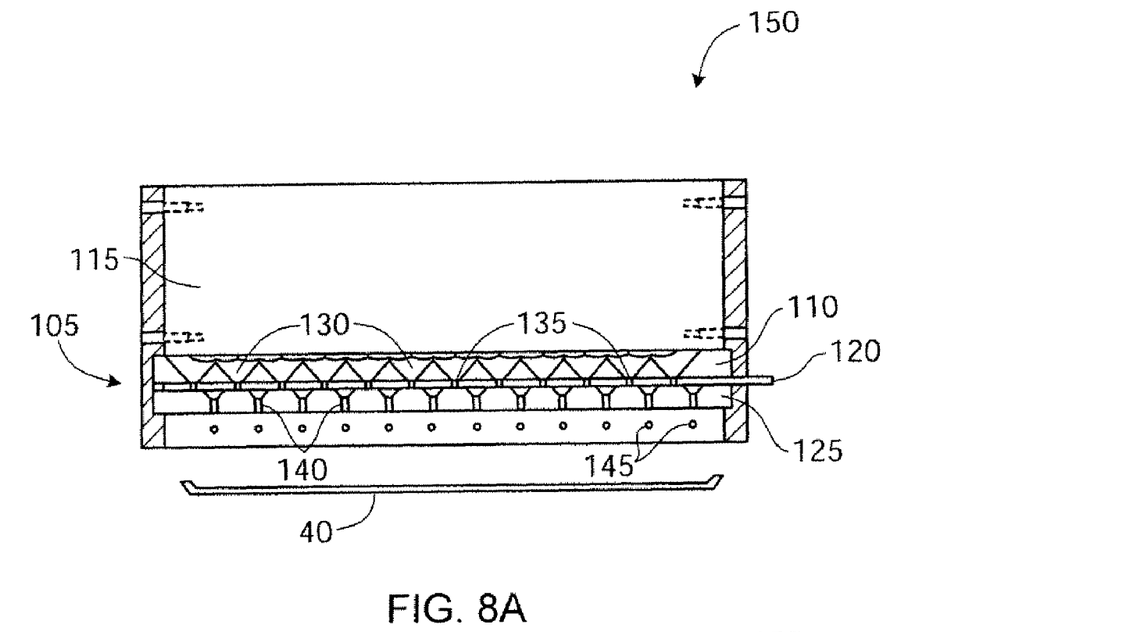
FIG. 8B depicts a cross-section of a seasoning dispensing sliding plate system in a portion dispensing position.
Figure 8B:
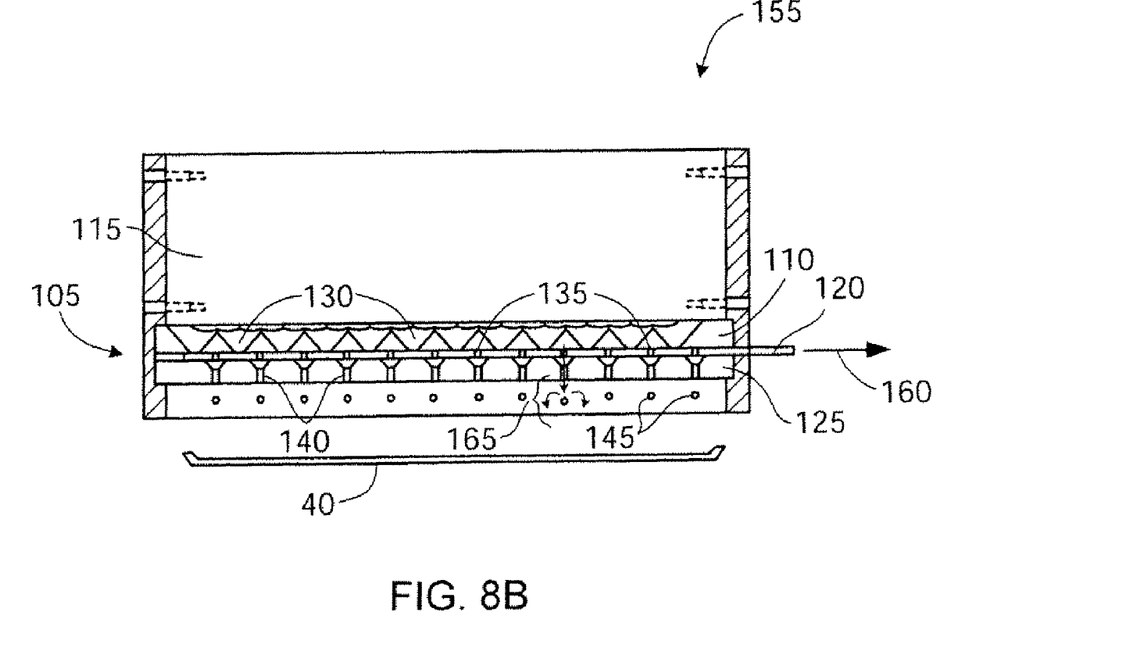

Operation of a seasoning dispensing sliding plate system is depicted in FIGS. 5A and 8B. FIG. 8A depicts a cross-section of a seasoning dispensing sliding plate system 105 in a portion loading position 150, and FIG. 8B depicts a cross-section of a seasoning dispensing sliding plate system 105 in a portion dispensing position 155. In operation, the hopper 115 contains a seasoning. The seasoning is in contact with the loading plate 110 and the seasoning fills the plurality of cavities 130 of the loading plate 110. In the loading position 150 of FIG. 8A, the seasoning also fills plurality of slide plate pockets 135 of the at least one slide plate 120 with one portion of seasoning. The portion of seasoning is held within the plurality of slide plate pockets 135 since it is blocked by the at least one dispenser plate 125.

In the portion dispensing position 155 of FIG. 5B, the at least one slide plate 120 is slid between the loading plate 110 and the at least one dispenser plate 125 in the direction indicated by slide arrow 160. It is recognized that depending on the configuration of a seasoning dispensing sliding plate system 105, the at least one slide plate 120 may be slid in the opposite direction, or in any direction, which results in dispensing a portion of seasoning. Upon sliding the at least one slide plate 120 to dispense a portion of seasoning, the seasoning in the plurality of slide plate pockets 135 is free to flow through the plurality of dispenser plate openings 140 of the at least one dispenser plate 125. In the portion dispensing position 155, seasoning cannot flow from the plurality of cavities 130 into the plurality of slide plate pockets 135 since it is blocked by the at least one slide plat 120, due to the positioning of the at least one slide plate 120 with respect to the positioning of the plurality of cavities 130.

In embodiments, as the seasoning is dispensed through the plurality of dispenser plate openings 140, as indicated by seasoning dispensing arrows 165, the seasoning may encounter a plurality of seasoning diverter rods 145. In this fashion each stream of seasoning may be divided into two or more streams of seasoning to provide a more even distribution of seasoning on the food product on a food receiving surface 40.

Referring back now to FIGS. 4A and 4B, details of an embodiment of a moveable transition tray 35 that is rotatable are shown in FIG. 4A with the tray 35 in the down or receiving position, and in FIG. 4B with the tray 35 in the up or delivering position. In an embodiment, the moveable transition tray 35 may include a transition tray motor 170, a cam arm 175, and at least one hinge block 180. The transition tray motor 170 drives the cam arm 175, and together with the at least one hinge block 180 enables the moveable transition tray 35, to rotate about an axis 50 from a down, near horizontal, food receiving position, to an up, inclined, near vertical, food delivery position. For convenience, the grouping of a transition tray motor 170, a cam arm 175, and at least one hinge block 180 is referred to herein as a tray rotation system.

An embodiment of the moveable transition tray 35 may further include a rear waste collection wall 185 and a waste collection tray 190. The waste collection tray 190 may be removable for easy cleaning. The rear waste collection wall 185 may be curved or angled. As such, wastes falling through the plurality of perforations 45 of the food receiving surface 40 hit on the rear waste collection wall 185 or directly fall into the waste collection tray 190. Further, when the moveable transition tray 35 is in the upright food delivery position, the wastes that have accumulated on the rear waste collection wall 185 are transferred into the waste collection tray 190.

Figure 9:
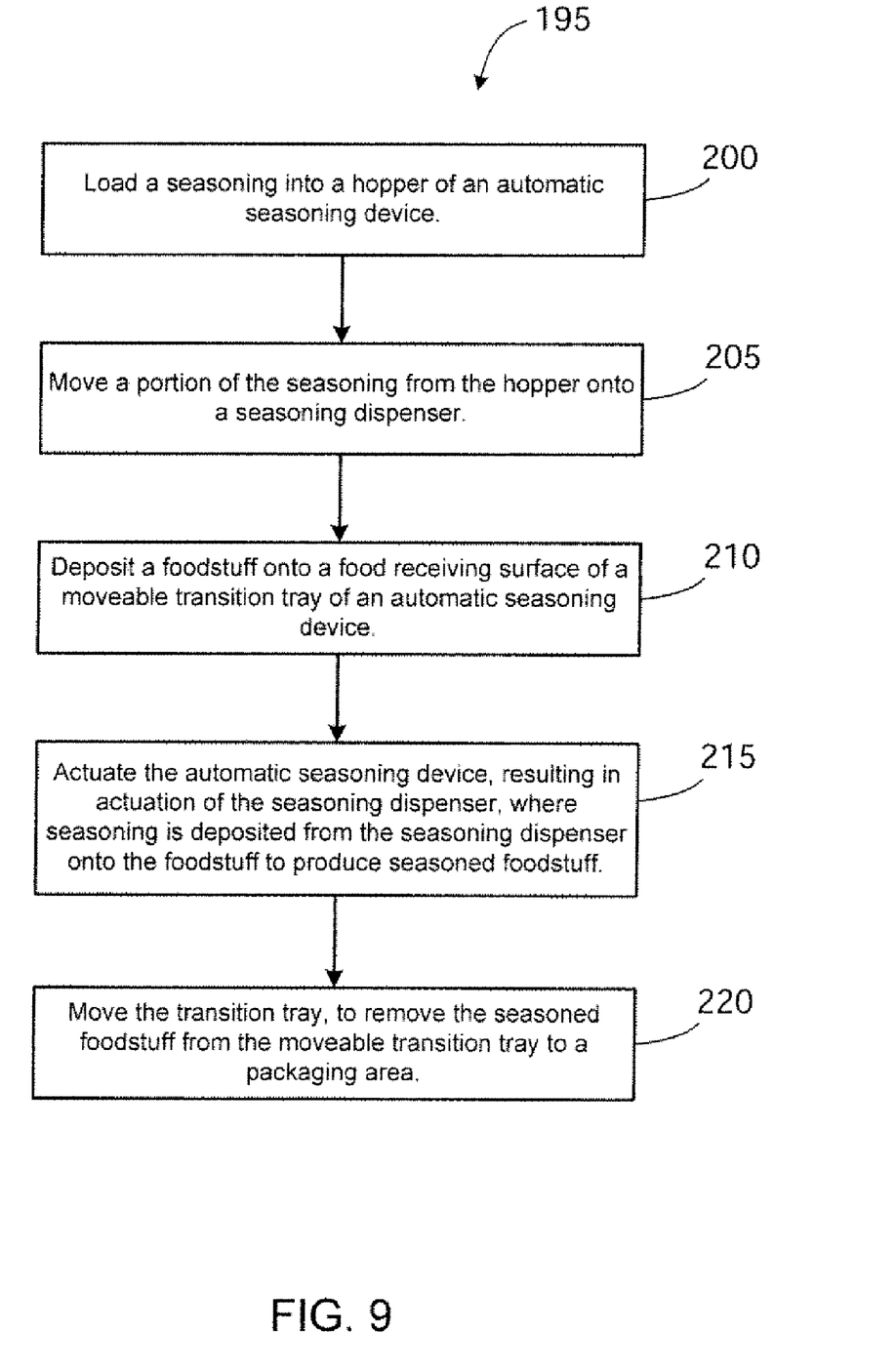
FIG. 9 is a flow chart of an embodiment of method of using an automatic seasoning device.

An embodiment of a method for automatically seasoning batches of foodstuffs 195 is presented in the flow diagram of FIG. 9. The foodstuff may be raw, cooked, fried, or otherwise prepared. A method for seasoning a foodstuff 195 may include loading 200 a seasoning into a hopper of an automatic seasoning device. A method may include moving 205 a portion of the seasoning from the hopper onto a seasoning dispenser. The moving of a portion of the seasoning from the hopper onto a seasoning dispenser may occur automatically. A method may further include depositing 210 a foodstuff onto a food receiving surface of a moveable transition tray of an automatic seasoning device, and actuating 215 the automatic seasoning device resulting in actuation of the seasoning dispenser, wherein the seasoning is deposited from the seasoning dispenser onto the foodstuff to produce a seasoned foodstuff. Actuation of the automatic seasoning device may occur automatically once a sensor engaged with the moveable transition tray detects a foodstuff on the food receiving surface. A method may include moving 220 the transition tray, to remove the seasoned foodstuff from the automatic seasoning device. The moving may occur automatically after the foodstuff is seasoned.

Upon actuation, in one embodiment corresponding to FIGS. 2-4, the deposition of seasoning may occur when a drum motor is automatically activated, and a rotatable drum adjacent to a hopper opening begins to rotate. In one embodiment, the rotatable drum includes grooves. The grooves may be designed to hold a pre-portioned amount of seasoning. As the drum rotates, it may rotate as such that only one grove is advanced from underneath the hopper opening, and only that one groove of pre-portioned seasoning is delivered to the foodstuff on the food receiving surface. Alternatively, when more seasoning is desired, either a drum with different sized grooves could be used, or the drum could rotate so that more than one groove passes the hopper opening. Thus more than one portion of seasoning is delivered to the foodstuff on the food receiving surface. Any other combination of groove size and drum rotation to deliver more or less seasoning to the foodstuff is contemplated in the embodiments herein.

To aid in even seasoning of the foodstuff, after the seasoning leaves the drum it is directed onto one or more seasoning diverter rods, which provide for a more even dispersion of seasoning on foodstuff on the food receiving surface. After the foodstuff is seasoned, a transition tray motor may automatically activate to move the seasoned foodstuff from the food receiving surface to a packaging area.

In an alternate embodiment corresponding to FIGS. 5-8, the deposition of seasoning may occur when a seasoning dispensing slide plate system is automatically activated. In one embodiment, the seasoning dispensing sliding plate system may include a loading plate containing a plurality of cavities, A seasoning dispensing sliding plate system may also include at least one slide plate that may contain a plurality of slide plate pockets. Prior to actuation, the plurality of slide plate pockets are positioned to receive and hold a pre-portioned amount of seasoning from the plurality of cavities. The seasoning dispensing sliding plate system may also include at least one dispenser plate, and the at least one dispenser plate may include a plurality of dispenser plate openings. Upon actuation of the seasoning dispensing sliding plate system, the at least one slide plate is moved by a motor, or alternatively manually, so that the at least one slide plate is positioned with respect to the at one dispenser plate, so that seasoning in the plurality of slide plate pockets falls through the plurality of dispenser plate opening to season the food. Alternatively, when more seasoning is desired, more than one slide plate and/or dispenser plate may be used.

To aid in even seasoning of the foodstuff after the seasoning falls through the plurality of dispenser plate openings, it is directed onto one or more seasoning diverter rods, which provide for a more even dispersion of seasoning on foodstuff on the food receiving surface. After the foodstuff is seasoned, referring now to FIG. 1, a transition tray motor may automatically activate to move the seasoned foodstuff from the food receiving surface to a packaging area.

EXAMPLE

Figure 10A:
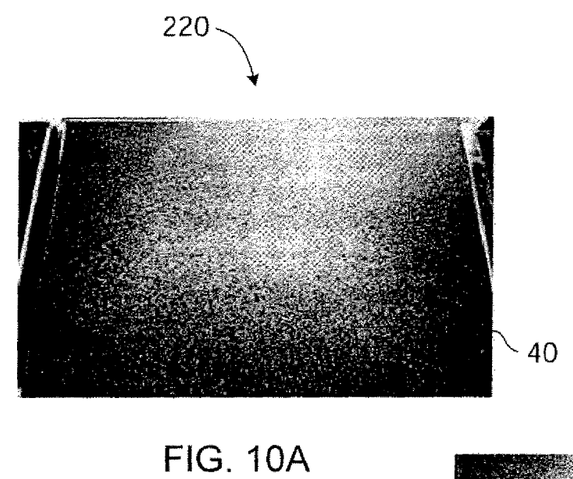
FIG. 10A depicts a typical salt dispersion pattern obtained by an instant embodiment.
Figure 10B:
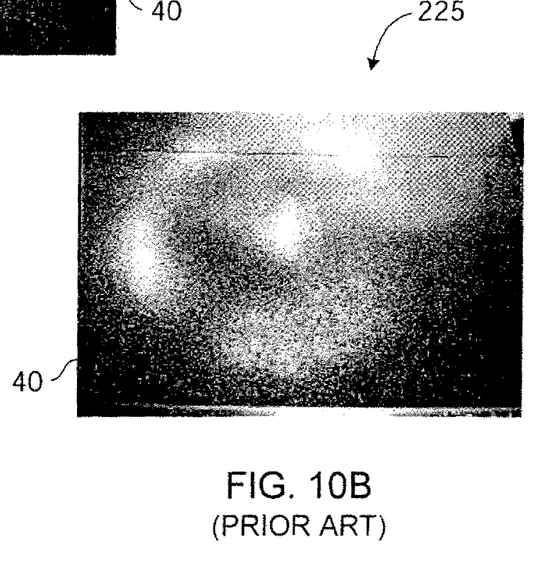
FIG. 10B depicts a typical salt dispersion pattern obtained by a prior art handheld shaking device.

A schematic example of the dispersion of seasoning, or seasoning pattern 220, when using the device and methods herein is provided in FIG. 10A. The depiction in FIG. 10A is representative of an instant embodiment seasoning pattern 220 that was obtained when three diverter rods 100 were positioned as depicted in FIG. 3. It is noted in FIG. 10A that the embodiments herein provide a relatively even seasoning pattern 220 of seasoning, and that in some embodiments the seasoning essentially covers the entire rectangular food receiving surface 40. A prior art seasoning pattern 225 of salt is depicted in FIG. 10B. This representation was acquired using a handheld salter that is typically currently used in fast food restaurants. The prior an seasoning pattern 225 is uneven and resembles a 'bullseye' pattern that has high concentrations of salt in the center, a circular band of relatively no salt, and a high concentration of salt in an outer circular band. Much of the food receiving surface 40 is not covered with the salt, as compared with the seasoning pattern 220 of the instant embodiment.

Referring again to FIG. 1, when the seasoning is delivered from the seasoning hopper 25 by a seasoning dispenser (not shown) to the foodstuff on the food receiving surface 40, the moveable transition tray 35 moves to the inclined food delivery position, and the seasoned foodstuff is delivered or tumbles to the packaging area 55. Tumbling of the seasoned foodstuff aides in producing an even coating of seasoning. The moveable transition tray 35 then returns to the down or food receiving position. This entire process may take less than three seconds. The process is restarted with the next batch of food to be seasoned delivered to the food receiving surface 40. As the seasoning process repeats, food wastes collect in the waste collection tray 190 (see FIG. 4), which may be removed for cleaning and waste disposal.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An automatic seasoning device, comprising:
a hopper;
a seasoning dispenser positioned to receive a seasoning from the hopper, wherein the seasoning dispenser comprises a seasoning dispensing drum comprising one or more grooves;
a moveable transition tray positioned to receive the seasoning from the seasoning dispensing drum;
a transition tray rotation system comprising: a transition tray motor; at least one cam arm connected to and driven by the transition tray motor; and at least one hinge block; and
an automatic actuating sensing device that automatically starts a seasoning process when food of a predetermined weight is detected on a surface of the transition tray.

2. The device of claim 1, wherein the seasoning dispenser further comprises a seasoning dispensing slide plate system.

3. The device of claim 1, further comprising a plurality of seasoning diverter rods positioned between the seasoning dispenser and the transition tray.

4. The device of claim 1, further comprising a waste collection tray positioned to collect waste form the moveable transition tray.

5. The device of claim 1, further comprising a packaging area positioned to collect foodstuffs from the moveable transition tray.

* * * * *